United States Patent [19]

King

[11] Patent Number: 4,562,077

[45] Date of Patent: Dec. 31, 1985

[54] METHOD FOR CONVERTING MALIC ACID TO LACTIC ACID IN WINE

[75] Inventor: Stephen W. King, Sarasota, Fla.

[73] Assignee: Microlife Technics, Inc., Sarasota, Fla.

[21] Appl. No.: 543,347

[22] Filed: Oct. 19, 1983

[51] Int. Cl.$^4$ .......................... C12G 1/00; C12P 7/56; C12N 1/36; C12N 1/20
[52] U.S. Cl. ..................................... 426/13; 426/15; 426/61; 435/139; 435/245; 435/253; 435/260
[58] Field of Search ............................ 426/13, 15, 61; 435/253, 260, 139, 245

[56] References Cited

U.S. PATENT DOCUMENTS

| | | | |
|---|---|---|---|
| 2,080,138 | 5/1937 | Krebs | 99/48 |
| 2,415,431 | 2/1947 | Krebs | 99/48 |
| 3,843,809 | 10/1974 | Luck | 426/192 |
| 3,968,256 | 7/1976 | Sing | 426/61 X |
| 3,975,545 | 8/1976 | Vedamuthu | 426/61 X |
| 4,350,708 | 9/1982 | Ruiz de Palacios | 426/11 |
| 4,380,552 | 4/1983 | Gestrelius | 426/52 |

OTHER PUBLICATIONS

Beelman, R. B., et al., Symposium: Microbiology and Wines, Chapter 9, 107 to 121 (1982).
Beelman, R. B., et al., Am. Journal of Enology and Viticulture 31: 269–276 (1980).
Gallander, J. F., Am. J. Enol. and Vitic. 30, 157–159 (1979).
Kunkee, R. E., Am. J. Vitic. 18, 71–77 (1967).
Beelman, R. B., et al., Am. J. Enol. and Vitic. 21, 193–200 (1970).
Kunkee, R. E., et al., Am. J. Enol. and Vitic. 15, 178–183 (1964).
Pilone, G. J., Am. R. Enol. and Vitic. 30, 326 (1979).
King, S. W., Master Thesis, Pennsylvania State University (Shelved 1982).
Beelman, R. B., et al., Am. J. Enol. Vitic. 28, 159–165 (1977).
Kole, M. et al., Biotechnology Letters 4, 695–700 (1982).
Beelman, R. B., et al., University of California at Davis, Grape and Wine Centennial Symposium Proceedings, 109–117 (1982).
Hayman, D. C. and P. R. Monk, Food Technology in Australia 34, 14–18 (1982).
Lafon-Lafourcade, S., et al., Anton. Leeuwenhoek J. Microbiol. 49, 349–352 (1983).
Silver, J., et al., Am. J. Enol. Vitic. 32, 64–72 (1981).

*Primary Examiner*—David M. Naff
*Attorney, Agent, or Firm*—Ian C. McLeod

[57] ABSTRACT

Wine having a reduced malic acid content is produced by inoculating wine or must with an activated bacterial culture that converts malic acid to lactic acid. The activated bacterial culture is produced by inoculating a concentrate of the bacteria into fruit juice to provide a high number of bacterial cells in the juice and holding the inoculated juice for a period without significant increase in cell population of the bacteria. The bacteria concentrate is a lyophilized or frozen culture concentrate of the bacteria that has been grown on a medium containing malic acid. When producing the frozen concentrate, a freeze stabilizing agent may be mixed with the bacteria.

11 Claims, No Drawings

METHOD FOR CONVERTING MALIC ACID TO LACTIC ACID IN WINE

BACKGROUND OF THE INVENTION

(1) Field of the Invention

The present invention relates to an improved method for the conversion of malic acid to lactic acid (malolactic fermentation) in wine. In particular the present invention relates to an improvement wherein the wine is inoculated directly with specially activated bacteria.

(2) Prior Art

Various methods have been devised for removing malic acid from wine. The removal involves the conversion of dicarboxylic L-malate to the monocarboxylic L-lactate with the resulting loss of one carboxyl acid group, so that the acidity of the wine is decreased. In certain instances the use of Leuconostoc species, Pediococcus species or Lactobacillus species for the malolactic fermentation has been suggested; however, the initial high acidity of the wine prevents a significant reduction of the amount of malic acid by the bacteria. The prior art methods are described in U.S. Pat. No. 4,380,552 to Gestrelius as well as in U.S. Pat. No. 2,080,138, 4,350,708, 3,843,809, 2,415,431. In the Gestrelius et al method, *Leuconostoc oenos* are protected by an alginate gel and the wine is percolated through the gel in the malolactic fermentation. This method is slow and is believed to be even less satisfactory in terms of malic acid reduction than a direct inoculation of the wine with the bacteria.

Other prior art which describes the inoculation of wine with bacteria includes Beelman R. B., et al. Symposium: Microbiology and Wines Chapter 9, 107 to 121 (1982); Beelman, R. B., et al. Am. Journal of Enology and Viticulture 31 269–276 (1980); Gallander, J. F., Am. J. Enol. and Vitic. 30, 157–159 (1979); Kunkee, R. E., Am. J. Vitic 18, 71–77 (1967) Beelman, R. B. et al., Am. J. Enol and Vitic 21, 193–200 (1970); Kunkee, R. E., et al., Am. J. Enol. and Vitic. 15, 178–183 (1964); Pilone, G. J., Am. J. Enol. and Vitic. 30 326 (1979); Mayer, K. et al., Die Weinwirtschaft 9 223–226 (1979); King, S. W., Masters Thesis, Pennsylvania State University, (Shelved 1982); Beelman, R. B., et al., Am. J. Enol. Vitic. 28, 159–165 (1977); Kole, M., et al., Biotechnology Letters 4, 695–700 (1982); Beelman, R. B., et al., University of California at Davis, Grape and Wine Centennial Symposium Proceedings 109–117 (1982); Hayman, D. C., Food Technology in Australia 34, 14–18 (1982); Lafon-Lafourcade, S., et al., Anton. Leeyvenhoek J. Microbiol. 49, 349–352 (1983); Silver, J., et al Am. J. Enol. Vitic. 32, 64–72 (1981). None of these methods are completely reliable.

Objects

It is therefore an object of the present invention to provide an improved method for reduction of malic acid levels in wine by a method wherein high numbers of bacteria are added directly to the wine or must after being specially activated. It is further an object to provide a method which is economical and reliable. These and other objects will become increasingly apparent by reference to the following description.

General Description

The present invention relates to an improved method for the conversion of malic acid to lactic acid in wine by the introduction of high numbers of activated bacterial cells into the wine which comprises:

(a) activating a concentrate of a bacterial culture, which has been previously grown in the presence of malic acid, in a nitrogen source, preferably yeast extract, augmented fruit juice as a medium to form an activated mixture of the bacteria containing at least about $10^5$ CFU per ml; and (b) introducing the activated mixture into wine or grape must and converting the malic acid to lactic acid.

During the activation step the bacterial cells (Leuconostoc) do not significantly increase in number, but rather are activated for the introduction into the wine or must. Thus the fruit juice medium of part (a) is not a "bulk starter", which functions to increase cell numbers. It is uncertain why the activating medium works.

The invention is particularly concerned with using a Leuconostoc species for the conversion, preferably *Leuconostoc oenos*. Also Pediococcus and Lactobacillus species can be used. The growth of the bacteria in malic acid in preparing the concentrate conditions the bacteria so that they have the necessary enzyme systems for the conversion.

The present invention also relates to a storage stable bacterial concentrate including a malolactic bacterial culture which has been grown in a growth medium containing malic acid, a carbohydrate source, a nitrogen source and essential minerals without external neutralization containing bacterial cells in an amount between about $10^8$ to $10^{13}$ CFU per gram.

Bacterial Concentrates

The preferred bacteria are *Leuconostoc oenos* NRRL-B-15333 and NRRL-B-15334. The fermentation characteristics of these bacteria are shown in the Table I.

TABLE I

| Characterization of *Leuconostoc oenos* | | |
|---|---|---|
| Characteristic | NRRL-B-15333 | NRRL-B-15534 |
| Morphology | Cocci; fairly elongated; singly, pairs, chains | Cocci; singly, pairs, chains |
| Gram strain | + | + |
| Catalase | − | − |
| Dextran formation from glucose | − | − |
| Growth in 10% ethanol at 18° C. | + | + |
| Growth at pH 3.2 | + | + |
| Acid and gas from glucose | + | + |
| Growth on: | | |
| Glucose | + | + |
| Arabinose | + | − |
| Fructose | + | + |
| Lactose | − | − |
| Maltose | − | ± |
| Mannose | + | + |
| Mannitol | + | − |
| Raffinose | − | − |
| Ribose | + | + |
| Salicin | + | + |
| Sucrose | ± | − |
| Trehalose | + | + |
| Xylose | − | − |
| Esculin | + | + |

The strains are quite similar. These strains are deposited with the Northern Regional Research Laboratories in Peoria, Ill. and are freely available upon request by name and number.

The growth medium for the bacteria used to prepare the concentrate includes malic acid which is converted to lactic acid, assimilable carbohydrate which is also converted to lactic acid, essential minerals and a nitrogen source. The DL-malic acid concentration is present in an amount between about 0.01 and 1.0 percent by weight. The carbohydrate is generally glucose. The nitrogen source is preferably hydrolyzed protein and yeast extract, which contain amino acids. The essential minerals include manganese and phosphate for Leuconostoc species.

The bacterial concentrates are generally prepared by centrifugation or other mechanical concentration of the bacterial cells from the growth medium. Reverse osmosis can also be used to provide concentrates of the bacterial cells. The concentrates usually contain at least about $10^8$ cells to about $10^{13}$ cells (CFU) per ml or per gram. The bacteria are not constantly neutralized during growth of the cells in forming the concentrates in order to condition them to the acid in the wine.

The bacterial concentrates are preferably provided in preserved form for storage and shipment. The bacterial concentrates can be frozen with a freezing stabilizing agent such as glycerol, non-fat dry milk powder, and malt extract and generally contain $10^8$ to $10^{13}$ CFU per ml. The bacteria can also be lyophilized or otherwise dried to a powder containing $10^8$ to $10^{13}$ CFU per gram. All of these variations are known to those skilled in the art.

Activated Mixtures

The bacterial culture concentrate is activated in a medium including a fruit juice (such as grape or apple juice) with added yeast extract or other nitrogen source. The bacteria are introduced into the activating medium at a level between about $1 \times 10^7$ CFU/ml and $1 \times 10^{10}$ CFU/ml. The bacteria are preferably activated by incubating at 18° C. to 25° C. for 48 to 72 hours. The bacteria do not significantly increase in number. The activated cells can then be added directly to the wine or grape must.

Conversion in Wine

The activated bacterial mixture is introduced into the wine or grape must. The bacteria are introduced to a level of at least about $10^5$ CFU per ml or per gram and preferably between about $10^6$ to $10^8$ CFU per ml in the wine or grape must.

SPECIFIC DESCRIPTION

The following Example 1 shows the preferred method of the present invention using *Leuconostoc oenos*.

Preparation of concentrates of *Leuconostoc oenos* NRRL-B-15533 and NRRL-B-15534.

1. *Leuconostoc oenos* NRRL-B-15533 and NRRL-B-15534 were each grown in a medium of the following composition by weight:
   2% glucose
   1% molasses
   0.5% yeast paste
   0.5% peptone
   0.4% DL-malic acid
   0.05% MnSO$_4$
   0.05% Na$_2$HPO$_4$ 2. The medium was sterilized at 121° C. for 10 minutes and was cooled to 30° C. The pH was adjusted to 5.0 with ammonia.

3. The above medium was inoculated with *Leuconostoc oenos* NRRL-B-15534 or NRRL-B-15533 which had been incubated in the same medium as 1. above for 48 hours at 28° C.

4. The fermentor was held at 28° C. for 72 hours without pH neutralization.

5. After 72 hours at 28° C. the bacteria were harvested.

6. The bacteria were centrifuged aseptically and sterile glycerol was added to a final concentration of 10% by volume. The concentrate was packaged into 85 g cups. These packages were quick-frozen and stored at −30° C. Both culture concentrates were stable when stored at −30° C. as can be seen from the following table:

| VIABLE CELL COUNTS OF CONCENTRATED CULTURES | | |
|---|---|---|
| | NRRL-B-15533 | NRRL-B-15534 |
| INITIAL | $2.00 \times 10^{10}$ CFU/ML | $0.83 \times 10^{11}$ CFU/ML |
| After 2 months storage at −30° C. | $2.25 \times 10^{10}$ CFU/ml | $1.00 \times 10^{11}$ CFU/ML |

It was unexpected that the cultures would be so storage stable, since earlier attempts produced relatively unstable concentrates.

Activation of frozen, concentrated activated cultures vs. Direct Inoculation.

1. *Leuconostoc oenos* NRRL-B-15533 and NRRL-B-15534 were used. The 85 g cups of each strain were thawed by placing the containers in cold water.

2. 1.5 ml of each thawed concentrate was inoculated into each of 100 ml sterile Welch's ™ Concord Grape Juice diluted 1:1 with water and 0.5% yeast extract (Aye Light, Anheuser-Busch) added. These were incubated at 24° C. for 48 hours. These bacteria were designated "activated" mixtures. During the activation period, the total Leuconostoc cell population did not significantly increase.

3. Standardized wine for evaluation of these cultures was prepared as follows:
(a) One liter of Welch's Concord Grape juice adjusted to 20° Brix with sucrose and pH 3.5 with 50% KOH in sterile 4 liter flask. Powdered cellulose (0.1% w/v) was added to simulate particulate matter in grape must.
(b) Sulfur dioxide (SO$_2$) was added in the form of Na$_2$S$_2$O$_5$ to a concentration of 100 mg/l.
(c) Five (5) grams of active dry yeast (*Saccharomyces cerevisiae* Montrachet #522; Universal Foods) were added to the juice.
(d) The juice was incubated at 24° C. for 5 days. After 5 days, active fermentation was completed, °Brix was less than 1% and ethanol concentration was 12.6% as determined by gas-liquid chromatography using a Perkin-Elmer 3920B gas chromatograph with a flame ionization detector. A 1.8 meter×0.4 cm glass column packed with 0.2% Carbowax 1500 on 80/100 Carbopack C (Supelco, Bellefonte, PA) was employed. The column temperature was 125° C., with injector and detector temperatures of 150° C. each. Helium carrier flow was 20 cc/min. The electrometer attenuation was 32 on the $10^2$ range. No sample preparations were necessary and sample size injected was one (1) μliter.

(e) Resulting wine was decanted into a one (1) liter sterile centrifuge bottle and spun at 4200 rpm for 2 hours. This was decanted into a sterile 2 liter Erlenmeyer flask and stored overnight at 4° C. to precipitate tartarates. This was decanted into a 1 liter sterile centrifuge bottle and spun at 4200 rpm for 2 hours.

(f) The pH was adjusted to 3.2 with 85% phosphoric acid.

(g) The total $SO_2$ content was determined to be 8 mg/l by the Aeration-Oxidation method of Beuschenstein and Ough, Am. J. Enol. Vitic. 29:161-165 (1978).

(h) The malic acid content was 0.346% as determined by gas-liquid chromatography using a Perkin-Elmer 3920B gas chromatograph with a flame ionization detector. A 1.8 meter×0.4 cm metal column packed with GP 10% SP-1000/1% $H_3PO_4$ on 100/120 Chromosorb® W AW (Supelco, Bellefonte, PA.) was employed. The column temperature was 165° C. with the injector and detector temperatures of 185° C. each. Helium carrier flow was 60 cc/min. The electrometer attenuation was 8 on the 10 range. The organic acids in the wine were methylated before injection. One ml of wine was added to a 12×75 mm screwcap tube. Then 0.4 ml of 50% $H_2SO_4$ and 2 ml of methanol were added. The mixture was heated at 55° C. in a water bath for 30 minutes. Then one ml water and 0.5 ml chloroform were added and the organic acids were extracted by inverting the tube 20 times. The tube was centrifuged at 2000 rpm for 2 minutes. One (1) μliter of the chloroform layer was used for injection into the gas chromatograph.

Wine Inoculation With Activated Mixture

After 48 hours, 1.0 ml of activated cells of NRRL-B-15533 and NRRL-B-15534 were inoculated into each of 100 ml of wine prepared as described above. At the same time, 1.0 ml of a 1:100 dilution of each freshly thawed frozen concentrated culture of *Leuconostoc oenos* was added to each of 100 ml of wine. This was designated direct inoculation.

4. All inoculated wine was incubated at 19° C. Uninoculated wine and grape juice controls also were included.

5. Viable counts were determined by the spread plate method. The medium was prepared as follows:
2% Microinoculum broth (Difco ™ Detroit, Mich.)
2% Folic acid assay medium (Difco)
0.5% Yeast extract The pH adjusted to 4.8 with L-malic acid, agar (Difco) was added to 2%; the medium was autoclaved for *exactly* 10 minutes, cooled to 50° C. and then poured aseptically into petri plates.

Results are shown in Table II.

TABLE II

| | VIABLE BACTERIAL COUNTS (CFU/ML) | | | |
|---|---|---|---|---|
| | NRRL-B-15533 | | NRRL-B-15534 | |
| | Direct Inoculation Method (Prior Art) | Activation Method | Direct Inoculation Method (Prior Art) | Activation Method |
| Frozen Concentrate | 2.34 × $10^{10}$ | 2.34 × $10^{10}$ | 8.30 × $10^{10}$ | 8.30 × $10^{10}$ |
| 0 Hr. Activation | — | 2.63 × $10^8$ | — | 1.24 × $10^9$ |

TABLE II-continued

| | VIABLE BACTERIAL COUNTS (CFU/ML) | | | |
|---|---|---|---|---|
| | NRRL-B-15533 | | NRRL-B-15534 | |
| | Direct Inoculation Method (Prior Art) | Activation Method | Direct Inoculation Method (Prior Art) | Activation Method |
| Mixture 48 Hr. Activation Mixture | — | 2.00 × $10^8$ | — | 1.80 × $10^9$ |
| 0 Hr. Wine | 1.80 × $10^6$ | 3.20 × $10^6$ | 6.40 × $10^6$ | 2.08 × $10^7$ |
| 48 Hr. Wine | 3.90 × $10^5$ | 2.19 × $10^6$ | 1.23 × $10^5$ | 1.91 × $10^7$ |

6. Malic acid concentration was determined in each wine sample on days 0, 7, 8, 12, 14, 16, 19 and 34. Results are shown in Table III.

TABLE III

| | Malic Acid Degradation (% Malic Acid) | | | | |
|---|---|---|---|---|---|
| | NRRL-B-15533 | | NRRL-B-15534 | | |
| Day | Activated | Direct | Activated | Direct | Control |
| 0 | 0.348 | 0.347 | 0.347 | 0.347 | 0.347 |
| 7 | 0.278 | 0.391 | 0.039 | 0.347 | 0.345 |
| 8 | 0.263 | 0.300 | 0.013* | 0.318 | 0.347 |
| 12 | 0.157 | 0.317 | — | 0.317 | 0.346 |
| 14 | 0.091 | 0.327 | — | 0.322 | 0.346 |
| 16 | 0.045 | 0.337 | — | 0.322 | 0.317 |
| 19 | 0.017* | 0.373 | — | 0.347 | 0.378 |
| 34 | — | 0.350 | — | 0.318 | 0.359 |

*Malolactic Fermentation complete.

As can be seen from the foregoing Example and Tables II and III, the activated method of the present invention provides a rapid method for the malic to lactic acid converstion. *Leuconostoc oenos* NRRL-B-15534 is especially fast (8 days) and for preserved cultures, both cultures are much faster than the prior art such as Silver, J., et al. (1981) cited previously.

I claim:

1. A method for the reduction of malic acid to lactic acid in wine which comprises:

(a) growing in a growth medium containing malic acid and a nitrogen source a bacterial culture that converts malic acid to lactic acid in wine, and thereafter concentrating the bacterial culture to produce a lyophilized culture concentrate or a frozen culture concentrate containing between about $10^8$ and $10^{13}$ cells per gram or per milliliter of concentrate;

(b) inoculating the lyophilized culture concentrate or the frozen culture concentrate after thawing into fruit juice containing a nitrogen source to provide about $10^7$ to $10^{10}$ bacterial cells per milliliter of the fruit juice and holding the inoculated fruit juice for 48 to 72 hours at 18° C. 25°C., such that the cell population of the bacteria does not significantly increase in number in the fruit juice, to activate the bacteria and produce a mixture of the activated bacteria and the fruit juice; and (c) introducing the mixture of activated bacteria and fruit juice into wine or grape must contain malic acid to provide a concentration of at least about $10^5$ bacterial cells per milliliter of wine or grape must and converting the malic acid to lactic acid with the bacteria to produce wine having a reduced malic acid content.

2. The method of claim 1 wherein the concentrate is produced by mechanically concentrating followed by lyophilizing or freezing the concentrate.

3. The method of claim 1 wherein the bacterial culture is *Leuconostoc oenos* NRRL-B-15533 or NRRL-B-15534.

4. The method of claim 1 wherein the bacterial concentrate produced is the frozen culture concentrate and a freezing stabilizing agent is mixed with the bacteria prior to freezing.

5. The method of claim 4 wherein the stabilizing agent is glycerol.

6. The method of claim 1 wherein the growth medium contains between 0.01 and 1.0 percent by weight of the malic acid.

7. The method of claim 1 wherein the bacterial culture is *Leuconostoc oenos*.

8. The method of claim 1 wherein the growth medium contains between about 0.01 and 1.0 percent by weight of the malic acid, and grape juice.

9. The method of claim 1 wherein the bacterial concentrate produced is the lyophilized culture concentrate.

10. The method of claim 1 wherein the activated bacteria is provided in the wine or grape must at a level of between about $10^6$ and $10^8$ bacterial cells per ml.

11. The method of claim 1 wherein the nitrogen source is yeast extract.

* * * * *